US012754457B2

(12) United States Patent
Zeng

(10) Patent No.: US 12,754,457 B2
(45) Date of Patent: Oct. 6, 2026

(54) REFLECTOR AND CHUCK ASSEMBLY THEREOF

(71) Applicant: GODOX PHOTO EQUIPMENT CO., LTD., Shenzhen (CN)

(72) Inventor: Weijun Zeng, Shenzhen (CN)

(73) Assignee: GODOX PHOTO EQUIPMENT CO., LTD., Shenzhen (CN)

( * ) Notice: Subject to any disclaimer, the term of this patent is extended or adjusted under 35 U.S.C. 154(b) by 320 days.

(21) Appl. No.: 18/571,836

(22) PCT Filed: May 13, 2022

(86) PCT No.: PCT/CN2022/092780
§ 371 (c)(1),
(2) Date: Dec. 19, 2023

(87) PCT Pub. No.: WO2023/029580
PCT Pub. Date: Mar. 9, 2023

(65) Prior Publication Data

US 2024/0288753 A1 Aug. 29, 2024

(30) Foreign Application Priority Data

Sep. 1, 2021 (CN) ......................... 202111029569.7

(51) Int. Cl.
*G03B 15/06* (2021.01)

(52) U.S. Cl.
CPC .................................... *G03B 15/06* (2013.01)

(58) Field of Classification Search
CPC ................................ G02B 15/06; A45B 25/02
(Continued)

(56) References Cited

U.S. PATENT DOCUMENTS 8,833,951 B1 * 9/2014 Pavlenko ............... G03B 15/06
362/18
10,268,105 B1 * 4/2019 Zhu ....................... F21V 7/0008
(Continued)

FOREIGN PATENT DOCUMENTS

CN 103262206 8/2013
CN 204157838 2/2015
(Continued)

OTHER PUBLICATIONS

WIPO, International Search Report for PCT/CN2022/092780, Jun. 29, 2022.

(Continued)

*Primary Examiner* — Jennifer D. Carruth
(74) *Attorney, Agent, or Firm* — Hodgson Russ LLP

(57) ABSTRACT

A chuck assembly comprises a base plate, a sliding ring, and a top plate. The base plate is used for bearing umbrella ribs hinged to the base plate. The sliding ring is fixed to the base plate and comprises an annular side wall and a guide rail, and the guide rail extends in the circumferential direction of the annular side wall. The top plate is rotatably sleeved on the sliding ring and is fixedly provided with a guide shaft facing the sliding ring, and the guide shaft is movably provided on the guide rail. The top plate rotates in the circumferential direction of the sliding ring, the guide shaft moves along the guide rail, and the top plate ascends and descends in the axial direction of the sliding ring; and the ascending and descending movement of the top plate presses the hinged ends of the umbrella ribs to rotate.

18 Claims, 8 Drawing Sheets

(58) Field of Classification Search
USPC ...................... 359/871; 362/16, 18; 396/200; 135/19.5, 33.2, 98, 99, 135
See application file for complete search history.

(56) References Cited

U.S. PATENT DOCUMENTS

| | | | | |
|---|---|---|---|---|
| 2007/0041201 A1* | 2/2007 | Mazzei | G03B 15/02 | 362/347 |
| 2010/0265691 A1* | 10/2010 | Ortiz-Gavin | G02B 5/09 | 359/853 |
| 2013/0322051 A1* | 12/2013 | Ortiz-Gavin | G03B 15/06 | 362/17 |
| 2014/0071697 A1* | 3/2014 | Portmann | F21V 7/18 | 362/319 |
| 2014/0192510 A1* | 7/2014 | Kim | G03B 15/02 | 362/16 |
| 2015/0168812 A1* | 6/2015 | Ortiz-Gavin | G03B 15/06 | 362/18 |
| 2016/0258595 A1* | 9/2016 | Mossdorf | F24S 23/715 | |
| 2017/0248834 A1* | 8/2017 | Ortiz-Gavin | G03B 15/06 | |
| 2021/0382374 A1* | 12/2021 | Yoo | G03B 15/02 | |
| 2021/0388942 A1* | 12/2021 | Zeng | G03B 15/06 | |
| 2023/0016559 A1* | 1/2023 | Briese | A45B 23/00 | |

FOREIGN PATENT DOCUMENTS

| | | |
|---|---|---|
| CN | 106062626 | 10/2016 |
| CN | 205809510 | 12/2016 |
| CN | 105815903 | 1/2018 |
| CN | 110347002 | 10/2019 |
| CN | 111474806 | 7/2020 |
| CN | 211431336 | 9/2020 |
| CN | 306615712 | 6/2021 |
| CN | 214041968 | 8/2021 |
| CN | 113625509 | 11/2021 |
| CN | 215769300 | 2/2022 |
| JP | 2016059456 | 4/2016 |
| KR | 101994601 | 6/2019 |
| WO | 2018199077 | 11/2018 |

OTHER PUBLICATIONS

EPO, Extended European Search Report for EP Application No. 22862723.8, Nov. 26, 2024.

CNIPA, First Office Action for CN Application No. 202111029569.7, Dec. 31, 2024.

* cited by examiner

REFLECTOR AND CHUCK ASSEMBLY THEREOF

CROSS-REFERENCE TO RELATED APPLICATIONS

This application is a national stage entry under 37 U.S.C. § 371 of International Application No. PCT/CN2022/092780, filed May 13, 2022, which claims priority to Chinese Patent Application No. 20111029569.7, filed Sep. 1, 2021, the entire disclosures of which are incorporated herein by reference.

TECHNICAL FIELD

The present disclosure relates to photographing equipment, in particular to a reflector and a chuck assembly thereof.

BACKGROUND

The reflector is installed on the studio lamp, which emits softer light and can eliminate the spot and shadow on the photo when shooting. The reflector mostly supports the reflective fabric through umbrella-shaped folded ribs to form a reflective surface of the reflector.

The larger the reflective surface for the reflector, the more uniform, colorful and softer the light. In order to meet the better shooting effect, the reflective area for the reflector is required to be larger and larger. However, for the reflector with too large volume, the plurality of ribs are required to be folded or unfolded one by one when the reflector needs to be closed or opened. These actions are too complex.

SUMMARY

There are provided a reflector and a chuck assembly thereof according to embodiments of the present disclosure. The technical solution is as below.

According to a first aspect of embodiments of the present disclosure, there is provided a chuck assembly for a reflector, including:

- a chassis configured to bear a plurality of ribs articulated with the chassis;
- a slip ring fixedly arranged on the chassis, the slip ring including an annular sidewall and at least one guide rail arranged on the annular sidewall, and each the guide rail extending circumferentially along the annular sidewall; and a top plate rotatably sleeved on the slip ring, the top plate being fixedly provided with a guide shaft facing the slip ring, and the guide shaft being movably arranged on the guide rail;
- wherein the top plate rotates circumferentially along the slip ring, the guide shaft moves along the guide rail, and the top plate lifts axially along the slip ring; and the top plate moves up and down to hold down an articulated end of the rib to rotate.

According to a second aspect of embodiments of the present disclosure, there is provided a reflector, including a rib, a reflective fabric and a chuck assembly, the reflective fabric is detachably arranged on the rib, and the articulated end of the rib is articulated on the chassis.

In an embodiment, an end of the rib away from the chuck assembly is provided with a tail bead, wherein the rib is threaded into the tail bead, wherein a pair of embedding trenches are provided on two opposite sides of the tail bead, wherein an over-wire hole is provided at the bottom of the embedding trenches, and the over-wire hole connects the two embedding trenches.

Figure 1:
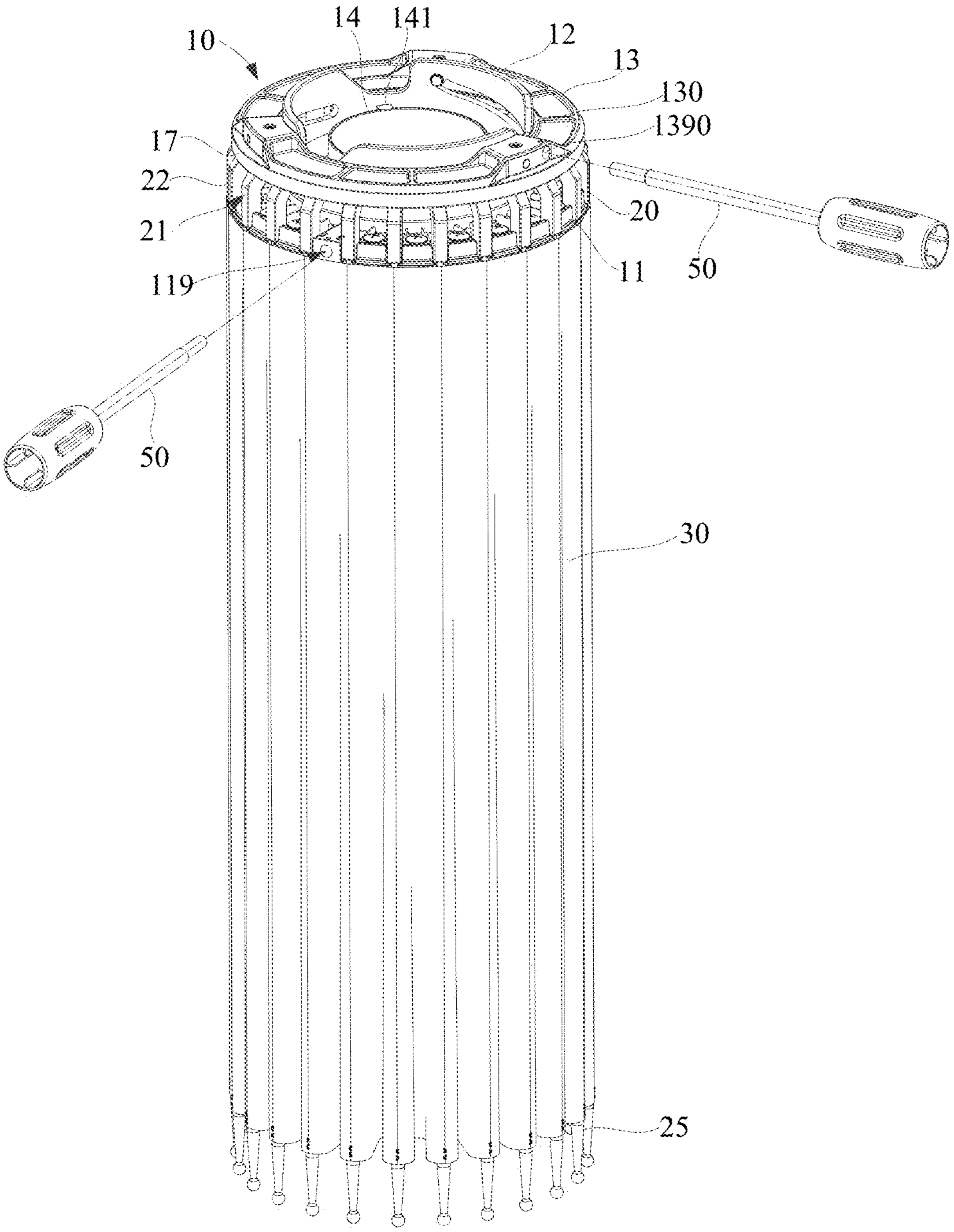
FIG. 1 is a perspective view of a reflector in a folded state according to the present disclosure.

10. chuck assembly; 11. chassis; 110. reinforcing rib; 111. articulating part; 112. shaft groove; 113. limiting member; 114. screw hole; 115. receiving groove; 116. grain; 119. second auxiliary hole site; 12. slip ring; 121. annular sidewall; 122. guide rail; 1221. first end; 1222. second end; 1223. flat section; 123. avoidance groove; 13. top plate; 130. reinforcing rib; 131. guide shaft; 132. boss; 133. guide shaft hole; 134. fixing groove; 135. fixing piece; 136. shaft sleeve; 137. receiving groove; 138. fixing edge; 139. slot; 1390. first auxiliary hole site; 14. bayonet; 141. bulge; 142. convex edge; 15. gasket; 16. needle roller plate; 161. plate body; 162. needle roller; 17. platen; 171. inner ring; 172. outer ring; 173. bevel;

20. rib; 21. articulated end; 22. articulated sleeve; 23. hold-down surface; 24. pivot; 25. tail bead; 252. embedding trench; 253. over-wire hole; 254. positioning slot;

30. reflective fabric; 31. window; 50. auxiliary pin; 91. screw; 92. fixing bolt.

DESCRIPTION OF THE EMBODIMENTS

The exemplary embodiments will now be described more fully with reference to the accompanying drawings. However, exemplary embodiments can be embodied in many different forms and should not be construed as limited to the examples set forth herein; on the contrary, these embodiments are provided so that the present disclosure will be thorough and complete, and will fully convey the concept of exemplary embodiments to a person skilled in the art. The accompanying drawings are only schematic illustrations of the present disclosure and are not necessarily drawn to scale. Like reference numerals in the figures denote identical or similar parts and thus repetitive descriptions thereof will be omitted.

Further, the described features, structures or characteristics may be incorporated in any suitable manner in one or more embodiments. In the following description, many specific details are provided to give a full understanding of the embodiments of the present disclosure. However, those skilled in the art will appreciate that the technical solution of the present disclosure may be implemented by omitting some one or more of particular details, or other methods, group elements, devices, steps, etc. may be employed.

In the present disclosure, the terms "install", "connect", "couple", "fix" and the like are to be understood in a broad sense, unless otherwise expressly specified and limited, which, for example, may refer to a fixed connection, a detachable connection, or an integral connection; which may refer to a mechanical connection, or an electrical connection intercommunication; which may refer to a direct connection or an indirect connection via an intermediate medium; which may also refer to a communication between the insides of two elements. For those ordinarily skilled in the art, the specific meanings of the above terms in the present disclosure will be understood according to the specific circumstances.

In addition, the terms such as "first" and "second" are used only for descriptive purposes, and should not be construed as indicating or implying relative importance or implying the number of indicated technical features. Thus, features limited by "first" and "second" may expressly or implicitly include one or more features. In the description of the present disclosure, "a plurality of" means at least two, e.g., two, three, etc., unless otherwise expressly and specifically defined.

The embodiments of the present disclosure are further elaborated below in conjunction with the accompanying drawings of the description.

The present disclosure provides a reflector and a chuck assembly thereof. The chuck assembly may be configured to fixedly connect the photography device (not shown) to the reflector, which is convenient for using the photography device to shoot. The photography device can be various light source devices, video cameras, zoom devices, etc. The reflector can be a soft box or a parabolic cover. An opening at one end of the reflector is configured to load a light source, and an opening at the other end of the reflector serves as a light outlet for the light source. In this embodiment, the reflector is a parabolic cover. When the light source is located at a focal point of the parabolic cover, the light is reflected into a parallel light beam through the reflective layer and emitted out from the light outlet of the reflector.

Figure 2:
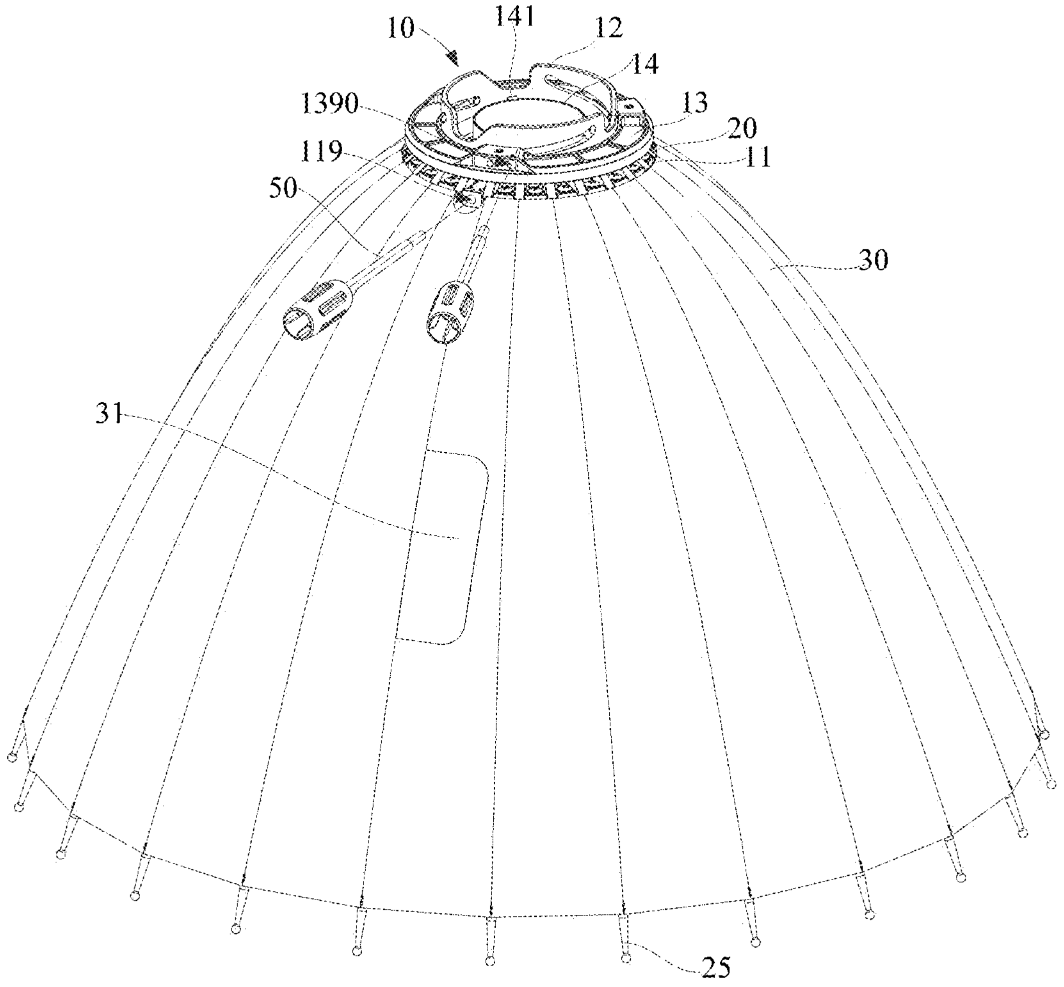
FIG. 2 is a perspective view of the reflector according to FIG. 1 in an unfolded state.

Referring to FIG. 1 and FIG. 2, in this embodiment, the reflector includes a chuck assembly 10, a plurality of ribs 20 and a reflective fabric 30. The reflective fabric 30 is detachably arranged on the rib 20. One end of the rib 20 is articulated to the chuck assembly 10. The rib 20 can be unfolded and folded, like an umbrella, relative to the chuck assembly 10, so as to unfold and fold the reflector. FIG. 1 is a view showing the reflector in a folded state, and FIG. 2 is a view showing the reflector in an unfolding state.

The rib 20 is a long and narrow support rod for supporting the reflective fabric. The rib 20 has certain elasticity and toughness, for example, the rib 20 may be made of fiber or metal rod material.

Figure 3:
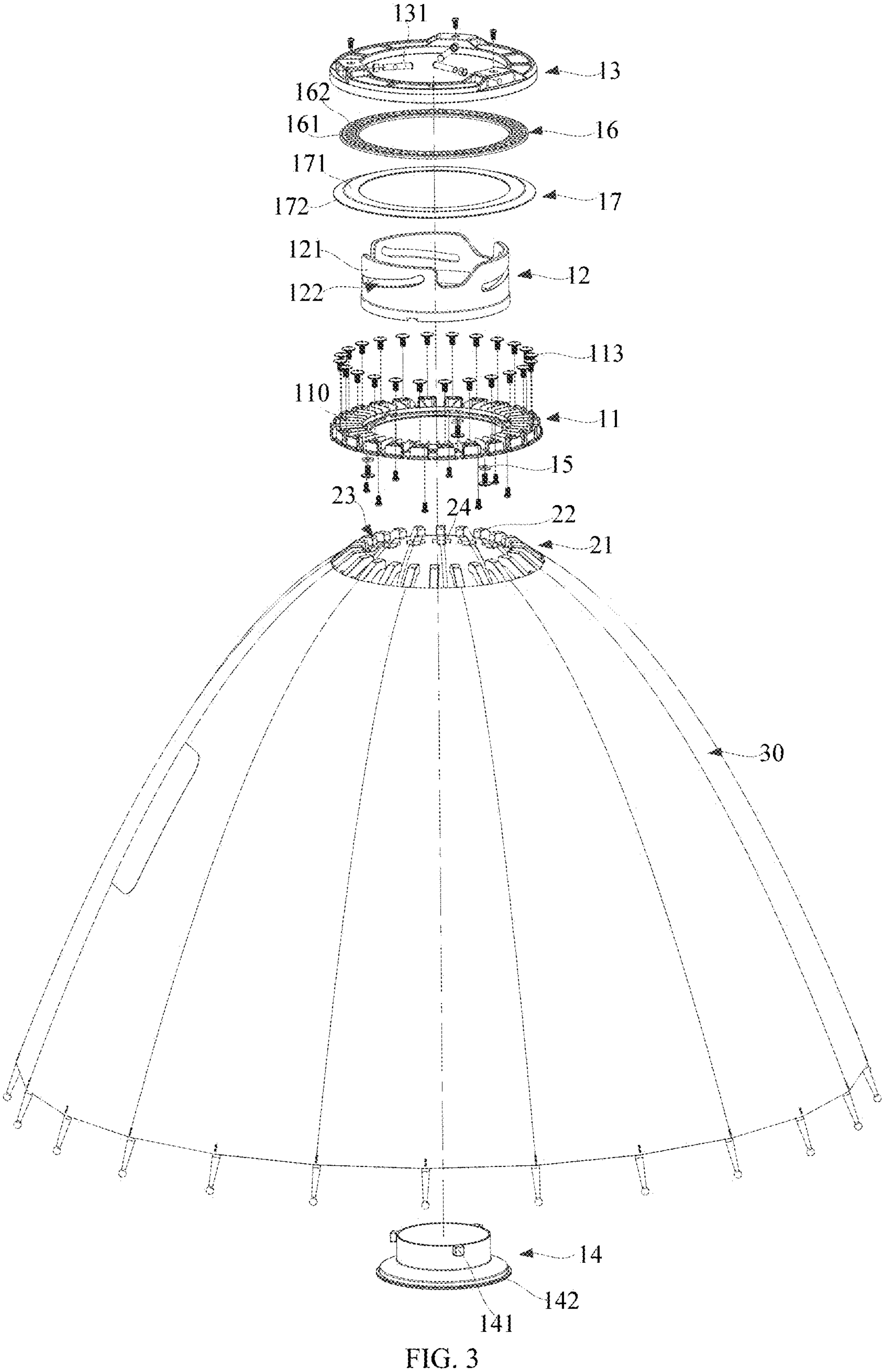
FIG. 3 is an exploded view of the reflector of FIG. 2.

Referring also to FIG. 3, an end of the rib 20 adjacent to the chuck assembly 10 is an articulated end 21. The articulated end 21 is sleeved with an articulated sleeve 22 at an outer side. The articulated end 21 is connected to the chuck assembly 10 through the articulated sleeve 22. The rib 20 is threaded into the articulated sleeve 22. The articulated sleeve 22 may be a plastic component. An outer volume of the articulated sleeve 22 is larger than an outer volume of the rib 20, so as to facilitate manipulation of the rib 20 by the chuck assembly 10 through the articulated sleeve 22.

Specifically, an outer side of the articulated sleeve 22 is provided with an arc-shaped hold-down surface 23. The surface of the holding surface 23 is an arc-shaped surface. The arc-shaped surface helps to hold down the articulated end 21 to move the rib 20. A pivot 24 is provided on two opposite sides of the articulated sleeve 22. The articulated end 21 rotates with the pivot 24 as an axis.

An end of the rib 20 away from the chuck assembly 10 is provided with a tail bead 25. The rib 20 is threaded into the tail bead 25. The tail bead 25 can be fixedly connected with the reflective fabric 30. Therefore, on the one hand, the tail bead 25 can cover the tail of the rib 20, and the reflective fabric is better fixedly connected with the rib 20 through the tail bead 25. On the other hand, the tail bead 25 may also be used for mounting a light efficiency accessory to increase the light efficiency for the reflector. For example, the tail bead 25 can be used for mounting soft yarn, beam grille and the like.

Figure 4:
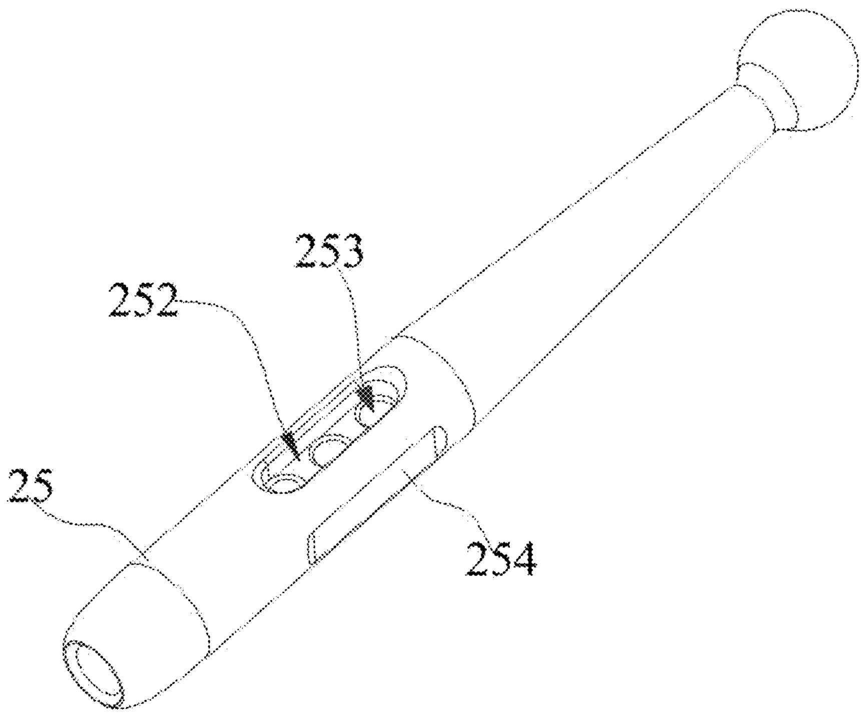
FIG. 4 is a perspective view of a tail bead of the reflector shown in FIG. 2.

Referring to FIG. 4, a pair of embedding trenches 252 are provided on two opposite sides of the tail bead 25. An over-wire hole 253 is provided at the bottom of the embedding trenches 252, and the over-wire hole 253 connects the two embedding trenches 252. Sutures pass through the over-wire hole 253, and the reflective fabric 30 is sewn and fixed to the tail bead 25. The sutures are housed in the embedding trench 252 to keep the surface of the tail bead 25 neat.

The tail bead 25 is also provided with at least one positioning groove 254. There are two positioning grooves 254, which are respectively arranged both opposite sides of the rod body. The positioning groove 254 facilitates the positioning of the flat-car die and the tail bead 25, and avoids the rotation of the tail bead 25 in the circumferential direction when stitching the tail bead 25 and the reflective fabric 30.

The reflective fabric 30 includes an inner reflective layer (not shown) and an outer light shielding layer (not shown). The reflective fabric 30 may be a scrim. In addition, the reflective fabric 30 is provided with a operable window 31. The window 31 is configured to allow electric cables of the light source and the like to pass through. The window 31 is covered with a reflective fabric to prevent the reflective surface of the reflector from being intact and to prevent light from being emitted out from the window 31. It can be understood that the window 31 can be unfolded and closed by hook and loop.

The chuck assembly 10 of this embodiment can also be configured to unfold and fold the rib 20 and the reflective fabric 30.

Referring also to FIG. 3, the chuck assembly 10 may include a chassis 11, a slip ring 12, and a top plate 13. The rib 20 is articulated to the chassis 11. While the top plate 13 rotates circumferentially along the slip ring 12, the top plate 13 lifts in an axial direction of the slip ring 12. The lifting movement of the top plate 13 relative to the chassis 11 holds down and rotates the articulated end 21 of the rib 20. The articulated end 21 of the rib 20 is relatively rotated to spread or gather the rib 20.

The chuck assembly 10 for the reflector makes it easy for the operator to put up each rib 20 without great strength, and the rib 20 can be spread out by rotating the top plate 13. When the rib 20 needs to be folded, the top plate 13 rotates in the reverse direction to release the limit of the rib 20 and fold the rib 20. Therefore, when using the chuck assembly 10 for the reflector, it is possible to avoid laborious operation by an operator, thus facilitating operation and improving the convenience for the reflector.

The chassis 11 is an annular pad. The chassis 11 may be made of metal to enhance the strength of the chassis 11 and increase the service life of the chuck assembly 10. Further, a plurality of reinforcing ribs 110 are provided on the surface of the chassis 11. The reinforcing ribs 110 may enhance the strength of the chassis 11 to ensure that the chassis 11 can be used repeatedly.

The chuck assembly 10 further includes a bayonet 14 for connecting the light source. The bayonet 14 is configured to connect the photography device. In the specific embodiment, the bayonet can be connected with a lighting device or a focusing lever zoom device. The photography device is illustrated by taking the light source and the focal lever zoom equipment which moves with the light source as examples. The bayonet 14 may be a Bowens bayonet or other special bayonet. The specific type of the bayonet 14 is not limited here.

In this embodiment, the bayonet 14 is provided with a plurality of bulges 141 on the outer side for engaging and connecting the photography device. The bulge 141 can realize the limited connection between the bayonet 14 and the photography device. It will be appreciated that when the bayonet 14 is a different type of bayonet 14, the bulge 141 may also be omitted. The bayonet 14 can also be limitedly connected with the photography device by other corresponding types of structures.

The bayonet 14 is detachably connected to the chassis 11. The inner ring of the chassis 11 is configured to mount the bayonet 14. The bayonet 14 is located inside the chassis 11. A central axis direction of the chassis 11 and a central axis direction of the bayonet 14 coincide with an optical axis direction for the reflector. A central axis direction of the slip ring 12 and a central axis direction of the top plate 13 coincide with the optical axis direction for the reflector.

Figure 5:
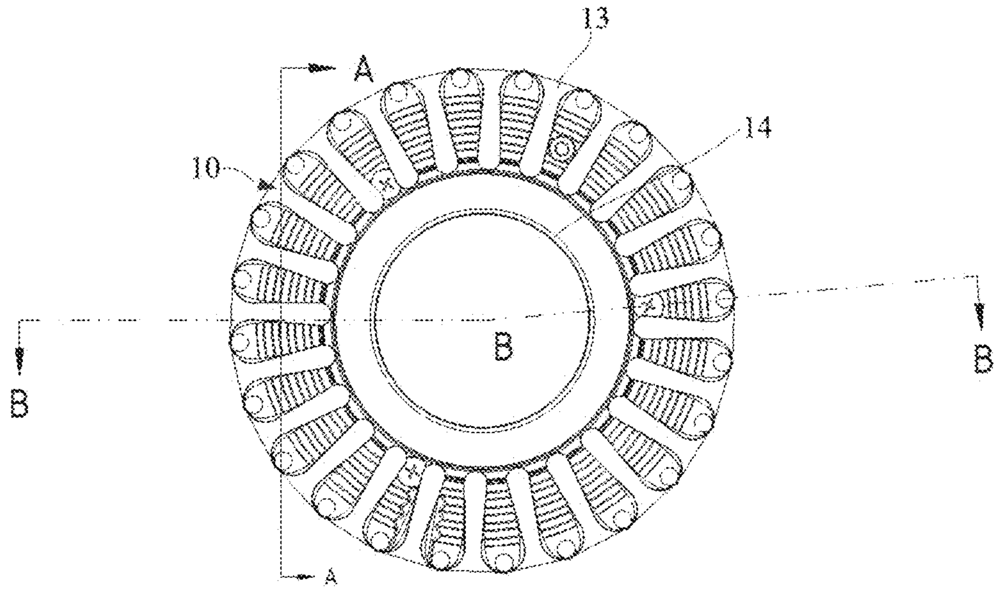
FIG. 5 is a top view of the reflector of FIG. 1.
Figure 6:
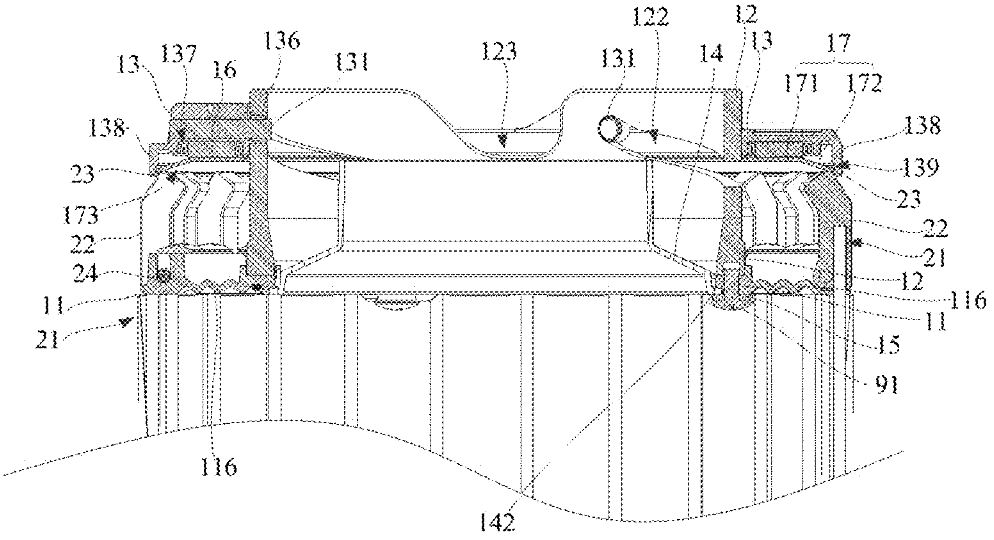
FIG. 6 is a section view in a B-B direction of the reflector of FIG. 5.

Referring also to FIGS. 5 and 6, the bayonet 14 is provided with a convex edge 142. The convex edge 142 can be fixedly connected to the chassis 11 by a screw 91, so that the bayonet 14 can be detachably connected to the chassis 11. The type of bayonet 14 may be replaced by removing the screw. In other embodiments, the bayonet 14 can also be detachably connected to the chassis 11 by means of a snap connection.

The chuck assembly 10 also includes a gasket 15. The gasket 15 is sleeved on the screw and held down on the convex edge of the bayonet 14 and the chassis 11, to ensure that the bayonet 14 can be stably fixed.

Figure 7:
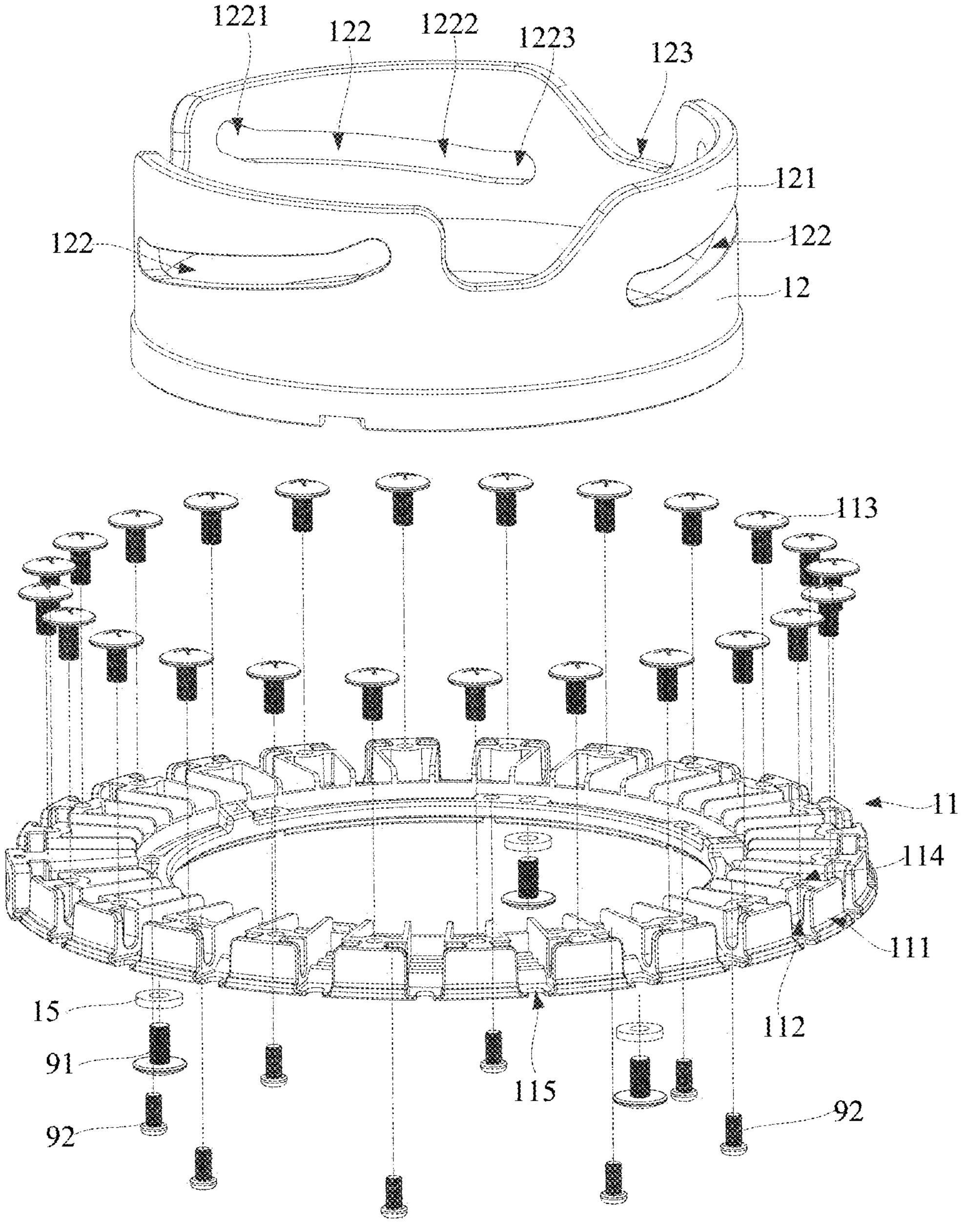
FIG. 7 is an enlarged partial view of the exploded view of the reflector in FIG. 3.

Referring also to FIG. 7, the annular bearing surface of the chassis 11 is configured to bear a plurality of ribs 20 articulated thereto. The annular bearing surface of the chassis 11 is provided with a plurality of articulating parts 111 for articulating the rib 20. The articulating parts 111 are uniformly distributed in the circumferential direction of the annular support surface. The articulating part 111 is protruded on the annular bearing surface of the chassis 11.

Specifically, a plurality of articulating parts 111 are provided spaced from each other. The shaft grooves 112 for accommodating the pivot 24 of the rib 20 are respectively provided on both sides of the articulating part 111. The shaft groove 112 has an opening in the top surface of the articulating part 111, and the pivot 24 of the articulated end 21 can enter the shaft groove 112 through the opening. Then the two pivots 24 located at the same articulated end 21 can be respectively received in the shaft grooves 112 of two adjacent articulating parts 111, and the articulated ends 21 forms an articulating connection with the articulating parts 111.

The top portion of the articulating part 111 is also provided with a limiting member 113, and the limiting member 113 blocks the opening of the top surface of the shaft groove 112. When the articulated end 21 is articulated with the articulating part 111, the articulating part 111 closes the opening of the shaft groove 112 on the top surface of the articulating part 111 by the limiting member 113. The limiting member 113 prevents the pivot 24 from slipping out of the shaft groove 112.

In this embodiment, it requires a certain height of the articulating part 111, also requires a certain height of the shaft groove 112. When the pivot 24 is passively rotated under pressure, the pivot 24 can also move up and down in the extending direction of the shaft groove 112. That is, when the rib 20 is in the folded state, the pivot 24 is located at the bottom of the shaft groove 112. When the rib 20 is in the unfolded state, the pivot 24 is located at the top of the shaft groove 112. When the pivot 24 moves up and down along the shaft groove 112 while rotating in the shaft groove 112, the articulated end 21 can be more easily rotated to a desired position to facilitate the unfolding for the reflector.

When the rib 20 is fully unfolded, the pivot 24 can be held against the limiting member 113 at the top portion of the shaft groove 112, to ensure that the rib 20 can be maintained stably in the unfolded state.

In this embodiment, the limiting member 113 may be a head screw. The top portion of the articulating part 111 is provided with a screw hole 114. When the head screw is screwed to the top portion of the articulating part 111, the head screw will seal the opening of the shaft groove 112 to prevent the pivot 24 from slipping out of the shaft groove 112. Thus, the limiting member 113 can achieve a limiting effect on the pivot 24 and enable the rib 20 to be maintained stably in the unfolded state.

An accommodation groove 115 for accommodating the rib 20 is also provided at an outer peripheral edge of the chassis 11. When the rib 20 is in the received state, the rib 20 can be received in the receiving groove 115, so that the reflector in the stowed state is kept flush and the appearance is kept neat. The number of the receiving grooves 115 may be set corresponding to the number of the ribs 20, and a plurality of receiving grooves 115 may be provided.

Referring to FIG. 6, the side surface of the chassis 11 facing away from the articulating part is provided with a grain 116. A surface of the grain 116 is provided with a diffuse reflective layer (not shown). The diffuse reflective layer can diffuse the light emitted by the light source, to ensure soft light inside the reflector. Specifically, in this embodiment, the chassis 11 has a wavy shape. The grain 116 of the chassis 11 may be wavy. In other embodiments, the grain may also be a stepped grain.

Referring to FIG. 7, the slip ring 12 may be a metal ring with a certain height. The slip ring 12 is fixedly arranged on the chassis 11. Specifically, the slip ring 12 is fixedly connected with the chassis 11 by screws. The end face of the slip ring 12 near the chassis 11 is provided with a screw hole, the slip ring 12 is arranged on the chassis 11, and a fixing bolt 92 passes through the chassis 11 and is screwed with the slip ring 12.

The slip ring 12 includes an annular sidewall 121 and a guide rail 122 provided on the annular sidewall 121. The guide rail 122 is configured to provide guidance for the rotation of the top plate 13 relative to the slip ring 12. The guide rail 122 extends circumferentially along the annular sidewall 121. The guide rail 122 extends helically along the annular sidewall 121. When the top plate 13 rotates along the guide rail 122, the top plate 13 rises or falls in the axial direction of the slip ring 12. In other embodiments, the guide rail 122 may also be an irregular arc shape, so that the guide rail 122 extends circumferentially along the annular sidewall 121 and has a projected length in the axial direction of the slip ring 12. The specific shape of the guide rail 122 is not limited here.

Specifically, in this embodiment, there are a plurality of guide rails 122. The plurality of guide rails 122 are distributed on the annular sidewall 121 of the slip ring 12 at intervals. The plurality of guide rails 122 may enable the top plate 13 to rotate stably along the slip ring 12.

The plurality of guide rails 122 are uniformly distributed on the annular sidewall 121. Specifically, there are three guide rails 122. The corresponding central angle of the rail 122 is less than 120 degrees. Due to the gap between adjacent guide rails 122, the central angle corresponding to the rail 122 is greater than 90 degrees.

Also, the guide rail 122 includes a first end 1221 and a second end 1222. The guide rail 122 extends gradually downward from the first end 1221 to the second end 1222. The guide rail 122 is also provided with a flat section 1223. The flat section 1223 is located on the same circumference of the slip ring 12. The flat section 1223 is located in the circumferential direction of the same cross section of the slip ring 12. In an axial direction perpendicular to the slip ring 12, the flat section 1223 is a horizontal section. The flat section 1223 may be provided at the first end 1221 or at the second end 1222 according to the corresponding motion state of the guide rail 122. In this embodiment, the second end 1222 is provided with the flat section 1223.

Specifically, in this embodiment, the guide rail 122 is a guide slot. The guide slot can be in the form of a through hole or a groove, so that it can guide the rotation.

An end face of the slip ring 12 away from the chassis 11 is provided with an avoidance groove 123. The avoidance groove 123 is configured to fit with a raised structure such as a locking device on the outside of the mounted photography device, so as to avoid interference with the installation and use of the photography device due to the height of the slip ring 12. A plurality of avoidance grooves 123 may be provided.

Figure 8:
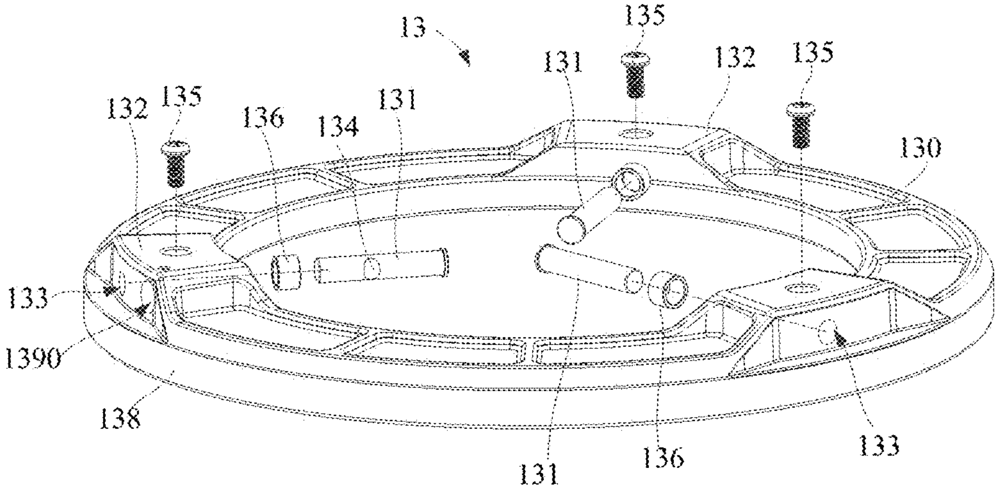
FIG. 8 is an exploded view of a top plate of the reflector in FIG. 3.

Referring to FIG. 8, the top plate 13 is an annular plate. The top plate 13 may be made of metal to enhance the strength of the top plate 13 and increase the service life of the chuck assembly 10. Further, a plurality of reinforcing ribs 130 are provided on the surface of the top plate 13. The reinforcing ribs 130 may enhance the strength of the top plate 13 to ensure that the top plate 13 can be used repeatedly.

The top plate 13 is rotatably sleeved on the slip ring 12. The top plate 13 rotates circumferentially along the slip ring 12, and the top plate 13 rises and falls axially along the slip ring 12. The lifting motion of the top plate 13 presses the articulated end 21 of the rib 20 to rotate and drives the rib 20 to unfold and fold.

The top plate 13 is fixedly provided with a guide shaft 131 facing the slip ring 12. In this embodiment, the top surface of the top plate 13 is provided with a boss 132. The boss 132 is provided with a guide shaft hole 133 in the radial direction of the top plate 13, and the guide shaft 131 is fixedly received in the guide shaft hole 133. In addition, a fixing groove 134 is provided on a cylindrical surface of the guide shaft 131.

The slip ring 12 is further provided with a fixing piece 135 for fixing the guide shaft 131. The fixing piece 135 penetrates into the guide shaft hole 133 from the top portion of the boss 132, and the fixing piece 135 can be received in the fixing groove 134 of the guide shaft 131. The fixing piece 135 limits the axial direction of the guide shaft 131 so that the guide shaft 131 can be stably received in the guide shaft hole 133.

Specifically, the fixing groove 134 is a arc-shaped groove. The fixing piece 135 is a fixing bolt. When the fixing bolt is screwed into the guide shaft hole 133 from the top surface of the boss 132, and the shape of the arc-shaped groove is adapted to the cylindrical shape of the fixing bolt, the fixing bolt is at least partially received in the arc-shaped groove, and the fixing bolt limits and fixes the guide shaft 131.

In other embodiments, the guide shaft 131 may also be fixedly disposed on the top plate 13 by other means such as welding, riveting or the like.

Figure 9:
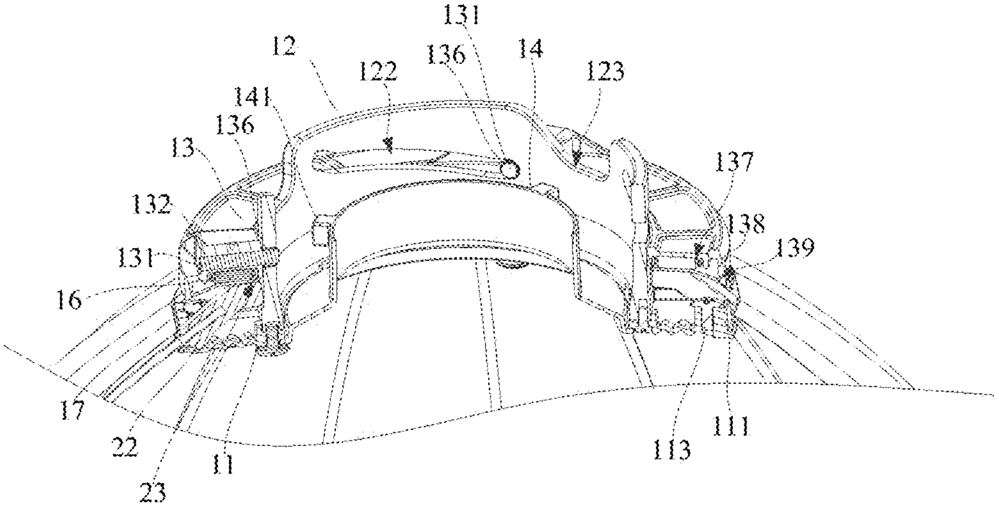
FIG. 9 is a section view of the reflector in FIG. 2.

Referring also to FIG. 9, the guide shaft 131 is movably arranged on the guide rail 122. When the top plate 13 rotates relative to the slip ring 12, the guide shaft 131 rotates along the trajectory of the guide rail 122. The top plate 13 moves up and down in the axial direction of the slip ring 12 under the guidance of the guide rail 122.

Specifically, in this embodiment, when the top plate 13 moves downward in the axial direction of the slip ring 12, the top plate 13 drives the reflector to unfold. The guide shaft 131 moves from the first end 1221 to the second end 1222 and remains positioned at the flat section 1223. Since the top plate 13 needs to hold the articulated end of the rib under high pressure when the reflector is in the unfolded state, the flat section 1223 can facilitate the guide shaft 131 to remain in a stable state there, so that the reflector remains at the unfolded state. When the top plate 13 moves upwards in the axial direction of the slip ring 12, the reflector is in a folding process. The guide shaft 131 first passes through the flat section 1223 and moves from the second end 1222 to the first end 1221.

In this embodiment, the guide shaft 131 is threaded into the guide slot. A shaft sleeve 136 is rotatably provided on the guide shaft 131, and the shaft sleeve 136 rolls along the guide slot. The shaft sleeve 136 converts the sliding friction force between the guide shaft 131 and the guide slot into the rolling friction force between the shaft sleeve 136 and the guide slot, thus reducing the friction force generated when the top plate 13 rotates relative to the slip ring 12, and facilitating the rotation of the top plate 13.

A plurality of guide shafts 131 are provided and evenly distributed on the top plate 13, to ensure that the top plate 13 can move stably along the guide rail 122. Accordingly, the boss 132, the guide shaft hole 133, the fixing piece 135, and the shaft sleeve 136 are all more than one, and are arranged at corresponding positions on the guide shaft 131.

Specifically, if the number of the guide rails 122 is three, the number of the guide shafts 131 is also three. The three guide shafts 131 are received respectively correspondingly in the three guide rails 122. The guide shafts 131 moves along the guide rails 122. A rotation angle of the guide axis 131 along the guide rail 122 is roughly 90 degrees, since a central angle corresponding to the guide rail 122 is approximately 90 degrees. When turning the top plate 13, a 90-degree rotation angle is relatively easier to operate for the operator, making it suitable for ergonomic design.

Referring again to FIG. 3, the chuck assembly 10 for the reflector of this embodiment further includes a needle roller plate 16 and a platen 17. The needle roller plate 16 and the platen 17 are sleeved on the slip ring 12 and are arranged between the chassis 11 and the top plate 13.

Figure 10:
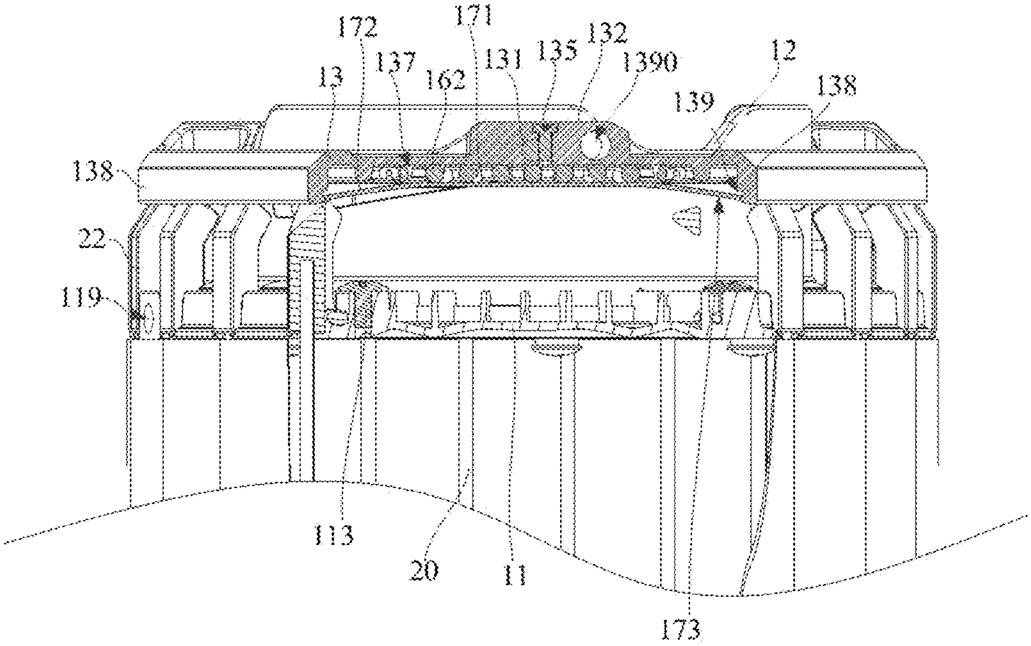
FIG. 10 is a section view in an A-A direction of the reflector in FIG. 5.

Referring to FIG. 3 and FIG. 10, the side face of the top plate 13 facing the chassis 11 is provided with an annular receiving groove 137. The receiving groove 137 is configured to receive the needle roller plate 16. The needle roller plate 16 includes a plate body 161 and a plurality of needle rollers 162 rotatably arranged on the plate body 161. The needle rollers 162 are cylindrical in uniform size, and a plurality of needle rollers 162 are distributed in the radial direction of the plate body 161, and the needle rollers rotate about their own axial direction. The needle roller 162 can freely rotate on the plate body 161. The needle roller 162 abuts against the bottom surface of the receiving groove 137 of the top plate 13, and the needle roller 162 is in linear contact with the top plate 13.

The outer periphery of the top plate 13 extends towards the chassis 11 to form a fixing edge 138. In this embodiment, a slot 139 for mounting the platen 17 is provided on the inner sidewall of the fixing edge 138. The slot 139 includes a transition section and a limit section. The platen 17 enters the slot 139 through the transition section and continues to slide into the limiting section, the platen 17 is limited in the slot 139. The platen 17 is inserted into the slot 139 by an interference fit, and the platen 17 needs to be located in the slot 139 to avoid separation between the platen 17 and the top plate 13. However, the platen 17 is also free to move, and the platen 17 can be rotated relative to the slip ring 12.

In other embodiments, the connection between the inner sidewall of the fixing edge 138 and the outer periphery of the platen 17 may also be achieved by other interference-fit structures.

The platen 17 is arranged below the needle roller plate 16 and above the chassis 11. The needle roller plate 16 is held down between the platen 17 and the top plate 13. The platen 17 can be used both to support the needle roller plate 16 and to hold down the articulated end 21 of the rib 20.

In this embodiment, the platen 17 includes an inner ring 171 and an outer ring 172 provided at an outer periphery of the inner ring 171. The inner ring 171 is provided corresponding to the opening of the receiving groove 137 of the top plate 13, so that the inner ring 171 can limit the needle roller plate 16 in the receiving groove 137. The inner ring 171 is disposed parallel to the needle roller plate 16, and the inner ring 171 serves to bear the needle roller plate 16. When the surface of the inner ring 171 facing the needle roller plate 16 is flat, the needle rollers of the needle roller plate 16 are kept in linear contact with the inner ring 171.

When the top plate 13 rotates, since the needle rollers of the top plate 13 and the needle roller plate 16 press each other, the top plate 13 drives the needle rollers to rotate, and the needle rollers rotate, a small rolling friction force is generated between the needle rollers and the platen 17, which is insufficient to rotate the platen 17, and the platen 17 maintains stable. Furthermore, the friction resistance of rotating the top plate 13 is greatly reduced, which facilitates the rotation operation of the top plate 13.

The outer ring 172 is provided with a bevel 173, and the bevel 173 bends towards the chassis 11. The bevel 173 is configured to hold down the articulated end 21 of the rib 20, and the articulated end 21 moves along the bevel 173. The articulated end 21 of the rib 20 is kept in line contact with the bevel 173 of the outer ring 172.

When the top plate 13 is rotated, the top plate 13 moves up and down, and there is pressure between the top plate 13 and the articulated end 21 of the rib 20. The point at which the bevel 173 held down the articulated end 21 is a stress point, and the articulated end 21 rotates on the pivot 24. Therefore, the outer ring 172 holds down the articulated end 21 to form a moment capable of rotating the articulated end 21.

Moreover, the needle roller plate 16 can uniformly transfer the pressure of the top plate 13 to the platen 17, so that the pressure on the platen 17 is also uniformly distributed. The platen 17 can also uniformly hold down the articulated ends 21 of the ribs, so that the pressure on the articulated ends 21 of each rib 20 is also relatively uniform, and the rotation of a plurality of ribs is consistent.

Referring to FIG. 1 and FIG. 2, the chuck assembly 10 for the reflector also includes an auxiliary pin 50. The outer side surfaces of the top plate 13 and the chassis 11 are respectively provided with auxiliary hole sites, and the auxiliary pin 50 is correspondingly inserted into the auxiliary hole sites.

A first auxiliary hole site 1390 is provided on the outer side surface of the top plate 13. A second auxiliary hole 119 is provided on the outer side surface of the chassis 11. Each of the first auxiliary hole site 1390 and the second auxiliary hole site 119 can be inserted with an auxiliary pin 50 which can be conveniently held by an operator. The operator holds each of the auxiliary pins 50 and exerts force at the same time, so that the auxiliary pins 50 can increase the torque of the rotating force, and the top plate 13 can be easily rotated relatively.

The opening position of the auxiliary hole site is required to be strong enough to ensure the strength of the top plate 13 and the chassis 11. Specifically, the first auxiliary hole site 1390 is provided on the outer sidewall of the boss 132 of the top plate 13. The second auxiliary hole site 119 is provided on the outer sidewall of the articulating part of the chassis 11.

A plurality of first auxiliary hole sites 1390 and a plurality of the second auxiliary hole sites 119 may be provided. The operator can select two of the first auxiliary hole sites 1390 and the second auxiliary hole sites 119 according to the ease of use, and the operation can be carried out at the auxiliary hole site with relatively convenient operation distance. The auxiliary hole site enhances the convenience of operation and is more humanized. Specifically, the central angle corresponding to the first auxiliary hole position 1390 and the second auxiliary hole position 119 is greater than the central angle corresponding to the guide rail 122, to ensure the operator's rotation operation, so that the guide shaft 131 of the top plate 13 can move from the first end 1221 of the guide rail 122 to the second end 1222, making a sufficient rotation angle between the top plate 13 and the chassis 11 to make the umbrella rib 20 fully open.

When the rotation is completed, the auxiliary pin 50 can be detached from the auxiliary hole site without affecting the volume size and normal use of the chuck assembly 10.

The auxiliary pin 50 can also be replaced by an ordinary screwdriver, a metal rod, etc. The auxiliary pin 50 can be replaced by other similar structure which can be matched with the auxiliary hole site to facilitate the rotation of the top plate 13.

Referring to FIG. 6, when the reflector is in the folded state, the guide shaft 131 of the top plate 13 is located at the first end 1221 of the guide rail 122. At this time, the top plate 13 is located at the end of the slip ring 12 away from the chassis 11. The articulated end 21 of the rib 20 is maintained in a vertical initial position, and the contact position between the articulated end 21 and the platen 17 is closer to the outside of the bevel 173. The pivot 24 of the articulated end 21 is located at the top of the shaft groove 112.

When the reflector needs to be unfolded, the operator rotates the two auxiliary pins 50 so that the two auxiliary pins are brought close to each other and the top plate 13 is driven to rotate. During the rotation of the top plate 13, the guide shaft 131 moves along the guide rail 122, and the top plate 13 moves close to the chassis 11. The top plate 13 holds down the articulated end 21 through the needle roller plate 16 and the platen 17. The articulated end 21 is rotated towards the chassis 11 by the effect of a rotational moment. When the articulated end 21 rotates with the pivot 24 as the pivot axis, the pivot 24 moves downward along the shaft groove 112, and the contact position between the articulated end 21 and the platen 17 moves from outside to inside along the bevel 173 until the rib 20 is fully unfolded.

Referring to FIG. 9, the guide shaft 131 of the top plate 13 moves to the flat section 1223 of the second end 1222 of the guide rail 122 when the reflector is in the unfolded state. The top plate 13 stops rotating and remains in position. The rib 20 is kept in the unfolded state, and the contact position of the articulated end 21 with the platen 17 is closer to the inside of the platen 17. The pivot 24 of the articulated end 21 is located at the bottom of the shaft groove 112. The flat section 1223 of the second end 1222 of the guide rail 122 enables the guide shaft 131 to remain in position, facilitating the positioning of the top plate 13.

When the reflector needs to be folded, the operator rotates the two auxiliary pins so that the two auxiliary pins are brought away from each other, and the top plate 13 is driven to rotate reversely. During the reverse rotation of the top plate 13, the guide shaft 131 moves in the reverse direction along the flat section 1223 of the guide rail 122 towards the first end 1221, and the top plate 13 moves away from the chassis 11. When the rotational torque applied to the articulated end 21 is reduced, and the articulated end 21 is rotated reversely to the initial position. The articulated end 21 rotates in the reverse direction with the pivot 24 as the pivot axis, and the pivot 24 moves upward along the shaft groove 112, and the contact position between the articulated end 21 and the platen 17 moves from inside to outside along the platen 17 until the rib 20 is completely folded.

The chuck assembly 10 for the reflector makes it easy for the operator to put up each rib 20 without great strength, and the rib 20 can be spread out by rotating the top plate 13. When the rib 20 is folded, the top plate 13 rotates in the reverse direction to release the held-down limiting of the rib 20 and fold the rib 20. Therefore, when using the chuck assembly 10 for the reflector, it is possible to avoid laborious operation by an operator, thus facilitating operation and improving the convenience for use of the reflector.

While the present disclosure has been described with reference to several exemplary embodiments, it should be understood that the terms used herein are illustrative and exemplary and are not limiting. Since the present disclosure can be embodied in various forms without departing from the spirit or essence of the present disclosure, it should therefore be understood that the foregoing embodiments are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. A chuck assembly for a reflector, comprising:

a chassis configured to bear a plurality of ribs articulated with the chassis;

a slip ring fixedly arranged on the chassis, the slip ring comprising an annular sidewall and at least one guide rail arranged on the annular sidewall, and each guide rail extending circumferentially along the annular sidewall; and a top plate rotatably sleeved on the slip ring, the top plate being fixedly provided with a guide shaft facing the slip ring, and the guide shaft being movably arranged on the at least one guide rail;

wherein the top plate rotates circumferentially along the slip ring, the guide shaft moves along the at least one guide rail, and the top plate lifts axially along the slip ring;

and the top plate moves up and down to hold down an articulated end of the plurality of ribs to rotate;

wherein the at least one guide rail is a guide slot, a shaft sleeve is rotatably sleeved on the guide shaft, the guide shaft is assembled into the guide slot via the shaft sleeve, and the shaft sleeve rolls along the guide slot.

2. The chuck assembly for a reflector according to claim 1, wherein each guide rail extends helically along the annular sidewall.

3. The chuck assembly for a reflector according to claim 1, wherein the at least one guide rail comprises a plurality of guide rails, and the plurality of guide rails are distributed on the annular sidewall of the slip ring at intervals.

4. The chuck assembly for a reflector according to claim 1, wherein each guide rail comprises a first end and a second end, the at least one guide rail gradually extending downward from the first end to the second end, and the first end or the second end being provided with a flat section, the flat section being located on a same circumference of the slip ring.

5. The chuck assembly for a reflector according to claim 1, wherein a top surface of the top plate is provided with a boss, wherein the boss is provided with a guide shaft hole along a radial direction of the top plate, and the guide shaft is fixedly received in the guide shaft hole.

6. A chuck assembly for a reflector, comprising:

a chassis configured to bear a plurality of ribs articulated with the chassis;

a slip ring fixedly arranged on the chassis, the slip ring comprising an annular sidewall and at least one guide rail arranged on the annular sidewall, and each guide rail extending circumferentially along the annular sidewall; and a top plate rotatably sleeved on the slip ring, the top plate being fixedly provided with a guide shaft facing the slip ring, and the guide shaft being movably arranged on the at least one guide rail;

wherein the top plate rotates circumferentially along the slip ring, the guide shaft moves along the at least one guide rail, and the top plate lifts axially along the slip ring;

and the top plate moves up and down to hold down an articulated end of the plurality of ribs to rotate;

wherein a platen and a needle roller plate are further arranged between the chassis and the top plate, the platen being configured to hold down the articulated end of the plurality of ribs, the needle roller plate being held down between the platen and the top plate, the needle roller plate comprising a plate body and a plurality of needle rollers rotatably disposed on the plate body, the plurality of needle rollers being distributed radically along the plate body, the plurality of needle rollers rotating around self-axes, and the plurality of needle rollers being in linear contact with the top plate and the platen.

7. The chuck assembly for a reflector according to claim 6, wherein a side surface of the top plate facing the chassis is provided with an annular receiving groove, and the needle roller plate is housed in the annular receiving groove.

8. The chuck assembly for a reflector according to claim 6, wherein the platen comprises an inner ring and an outer ring arranged at an outer periphery of the inner ring, wherein the inner ring is arranged parallel to the needle roller plate, and the inner ring is configured to bear the needle roller plate.

9. The chuck assembly for a reflector according to claim 8, wherein the outer ring is provided with a bevel, wherein the bevel is bent towards the chassis, wherein the bevel is configured to hold down the articulated end of the plurality of ribs, wherein the articulated end moves along the bevel.

10. The chuck assembly for a reflector according to claim 9, wherein the articulated end of the plurality of ribs is in line contact with the bevel of the outer ring.

11. The chuck assembly for a reflector according to claim 6, wherein an outer periphery of the top plate extends towards the chassis and forms a fixing edge, wherein the fixing edge is provided with a slot, wherein an outer periphery of the platen slides into the slot through interference fit, and the platen is limited in the slot.

12. The chuck assembly for a reflector according to claim 1, wherein the chuck assembly further comprises a bayonet for connecting a photography device, the bayonet being detachably connected to the chassis.

13. The chuck assembly for a reflector according to claim 1, wherein outer sides of the top plate and the chassis each are provided with at least one auxiliary hole site.

14. The chuck assembly for a reflector according to claim 13, wherein the chuck assembly further comprises an auxiliary pin, wherein the auxiliary pin is correspondingly inserted into the at least one auxiliary hole site.

15. The chuck assembly for a reflector according to claim 13, wherein the at least one auxiliary hole site comprises a plurality of auxiliary hole sites on the top plate and a plurality of auxiliary hole sites on the top plate on the chassis.

16. A reflector comprising a plurality of ribs, a reflective fabric and a chuck assembly, wherein the chuck assembly comprises:

a chassis configured to bear the plurality of ribs articulated with the chassis;

a slip ring fixedly arranged on the chassis, the slip ring comprising an annular sidewall and at least one guide rail arranged on the annular sidewall, and each guide rail extending circumferentially along the annular sidewall; and a top plate rotatably sleeved on the slip ring, the top plate being fixedly provided with a guide shaft facing the slip ring, and the guide shaft being movably arranged on the at least one guide rail;

wherein the top plate rotates circumferentially along the slip ring, the guide shaft moves along the at least one guide rail, and the top plate lifts axially along the slip ring;

and the top plate moves up and down to hold down an articulated end of each rib to rotate;

wherein the at least one guide rail is a guide slot, a shaft sleeve is rotatably sleeved on the guide shaft, the guide shaft is assembled into the guide slot via the shaft sleeve, and the shaft sleeve rolls along the guide slot;

wherein the reflective fabric is detachably arranged on each rib, and the articulated end of each rib is articulated on the chassis.

17. The reflector according to claim 16, wherein an end of each rib away from the chuck assembly is provided with a tail bead, wherein each rib is threaded into the tail bead, wherein a pair of embedding trenches are provided on two opposite sides of the tail bead, wherein an over-wire hole is provided at the bottom of the embedding trenches, and the over-wire hole connects the two embedding trenches.

18. The reflector according to claim 17, wherein the tail bead is also provided with at least one positioning groove, wherein the at least one positioning groove comprises two positioning grooves, which are respectively arranged both opposite sides of a rod body.

* * * * *